United States Patent
Sekine et al.

(10) Patent No.: US 7,567,600 B2
(45) Date of Patent: Jul. 28, 2009

(54) LASER DIODE DRIVER AND N-WAVELENGTH OPTICAL PICKUP INCLUDING THE SAME

(75) Inventors: Hisamichi Sekine, Tokyo (JP); Yoshihiro Okuyama, Yamagata (JP); Masahiro Ishikawa, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/862,405

(22) Filed: Sep. 27, 2007

(65) Prior Publication Data
US 2008/0080576 A1  Apr. 3, 2008

(30) Foreign Application Priority Data
Oct. 2, 2006  (JP)  ............................ P2006-270354

(51) Int. Cl.
*H01S 3/13*  (2006.01)
*H01S 3/00*  (2006.01)

(52) U.S. Cl. ............................... 372/38.02; 372/29.014; 372/29.015

(58) Field of Classification Search ............ 372/29.014, 372/29.015, 38.02
See application file for complete search history.

(56) References Cited

U.S. PATENT DOCUMENTS 7,372,799 B2 * 5/2008 Nagara ........................ 369/116

FOREIGN PATENT DOCUMENTS

| JP | 11-149652 | 6/1999 |
| JP | 2003-173563 | 6/2003 |

* cited by examiner

*Primary Examiner*—Armando Rodriguez
(74) *Attorney, Agent, or Firm*—Whitham Curtis Christofferson & Cook, P.C.

(57) ABSTRACT

A laser diode driver for driving laser light sources of a N-wavelength optical pickup capable of recording on and playing N types of optical discs by using N laser beams having different wavelengths, the N-wavelength optical pickup including first to N-th laser diodes for emitting first to N-th laser beams as the laser light sources and one front monitor for monitoring intensity of the first to N-th laser beams, the laser diode driver comprising a current/voltage conversion amplifier for converting a monitor current monitored by the front monitor into a monitor voltage and outputting the monitor voltage as a monitor output signal, wherein N is an integer which is two or more.

8 Claims, 4 Drawing Sheets

LASER DIODE DRIVER AND N-WAVELENGTH OPTICAL PICKUP INCLUDING THE SAME

BACKGROUND OF THE INVENTION

1. Technical Field

The present invention relates to an optical pickup, and more particularly, to a laser diode driver for driving laser light sources of a N-wavelength optical pickup capable of recording on and playing N types of optical discs by using N laser beams having mutually different wavelengths.

2. Related Art

The optical disc drive is operative to read or record information recorded on an optical disc (a CD, a CD-ROM, a CD-R/RW, a DVD-ROM, a DVD±R/RW, a Blu-ray disc, an HD-DVD, or the like). These types of optical disc drives include an optical pickup for irradiating a laser beam on the optical disc and detecting the reflected light therefrom in order to perform reading information from the optical disc or recording information on the optical disc.

On the other hand, as well known, there has been developed a DVD device in which an optical disc drive having a particular pickup is built in order to record on and play any one of a digital versatile disc (DVD) and a compact disc (CD). Such a particular optical pickup performs a recording and playing operation by individually using two kinds of laser beams which have a short wavelength laser light (a wavelength of 650 nm or so) for DVDs and a long wavelength laser light (a wavelength of 780 nm or so) for CDs, which is called "dual wavelength optical pickup".

Generally, there has been provided one type of the dual wavelength optical pickups including a first laser diode for DVDs that emits short wavelength laser light (i.e., first laser light) for DVDs and a second laser diode for CDs that emits long wavelength laser light (i.e., second laser light) for CDs (for example, see Patent Document 1).

However, there has been a problem that size of the optical pickup is increased due to an increase in the number of parts when the first laser diode and the second laser diode are separately provided. In order to deal with such a problem, there has been developed and introduced a laser diode (hereinafter, it is refer to as "one-chip laser diode") in which the first laser diode and the second laser diode are integrated into one part (chip) (for example, see Patent Document 2). Such a one-chip laser diode can be miniaturized. In the one-chip laser diode, a first luminous point emitting a first laser light and a second luminous point emitting a second laser light are apart from each other by a predetermined distance (for example, 100 μm), and thus the first laser beam and the second laser beam are emitted at a predetermined distance apart from each other.

Recently, there has been developed a DVD device in which an optical disc drive having a particular pickup is built in order to record on and play not only a DVD and a CD but also an HD-DVD (High Definition DVD). Such a particular optical pickup performs recording and playing operation by individually using three kinds of laser beams which include a medium wavelength laser beam (a wavelength of 650 nm or so) for DVDs, a long wavelength laser beam (a wavelength of 780 nm or so) for CDs, and a short wavelength laser beam (a wavelength of 410 nm or so) for HD-DVDs, which is called "triple wavelength optical pickup".

In the triple wavelength optical pickups, the one-chip laser diode (two-wavelength one package laser diode) for CDs and DVDs, a blue laser diode for HD-DVDs, may be used respectively, as disclosed in the Patent Document 2. In addition, hereinafter the HD-DVD is also referred to as HD.

Generally, an optical pickup includes a laser light source for emitting a laser beam and an optical system for guiding the emitted laser beam to an optical disc and guiding the reflected light from the optical disc to a photo detector. The optical system includes an objective lens which is disposed so as to face the optical disc. The laser light source and the photo detector are mounted on an outer wall of an optical base, and the optical system except for the objective lens is mounted in the optical base. The optical system also includes a front monitor for monitoring intensity of the laser light emitted from the laser light source. The laser light source is driven by a laser diode driver (LDD). The laser diode driver drives the laser light source on the basis of the intensity of the laser light monitored by the front monitor.

Patent Document 1: JP-A-2003-173563
Patent Document 2: JP-A-11-149652

In the triple wavelength optical pickup as described above, the one-chip laser diode (i.e., two-wavelength one package laser diode) and the blue laser diode for HD-DVDs can be employed as the laser light sources. In this case, it is required that a first laser diode driver for driving the two-wavelength one package laser diode and a second laser diode driver for driving the blue laser diode are provided as the laser diode driver. In addition, it is also required that two systems including a first front monitor for monitoring intensity of laser light emitted from the two-wavelength one package laser diode and a second front monitor for monitoring intensity of laser light emitted from the blue laser diode are provided as the front monitor. Hence, in the known triple wavelength optical pickup, there is a disadvantage that the number of terminals of the triple wavelength optical pickup increases in accordance with an increase in the number of input/output terminals of the laser diode drivers for driving the laser light sources.

Generally, there is a disadvantage in the case of an optical pickup dealing with N (N is an integer which is two or more) wavelengths.

SUMMARY

An object of the invention is to provide a laser diode driver capable of driving the laser light sources of the N-wavelength optical pickup by using a small number of input/output terminals.

An aspect of the invention provides a laser diode driver 120 for driving laser light sources 11 and 12 of a N-wavelength optical pickup 10 capable of recording on and playing N types of optical discs by using N (where N is an integer which is two or more) laser beams having different wavelengths, the N-wavelength optical pickup 10 including first to N-th laser diodes (CD-LD, DVD-LD, HD-LD) for emitting first to N-th laser beams as the laser light sources and one front monitor 25 for monitoring intensity of the first to N-th laser beams, the laser diode driver comprising a current/voltage conversion amplifier 121 for converting a monitor current monitored by the front monitor 25 into a monitor voltage and outputting the monitor voltage as a monitor output signal.

The laser diode driver further comprises a selective driving unit 123 and 126 for selectively driving one of the first to N-th laser diodes in response to a selection signal. It is preferable that the current/voltage conversion amplifier 121 can select first to N-th monitor-voltage conversion gains corresponding to the first to N-th laser diodes. In this case, the laser diode driver 120 further includes a selection unit 123 and 125 for selecting one of the first to N-th monitor-voltage conversion gains of the current/voltage conversion amplifier 121 in response to the selection signal.

In addition, the reference numerals and signs in the brackets are noted in order to help with understanding the invention, so the invention may not be limited to this.

In the invention, the optical pickup includes one current/voltage conversion amplifier for converting, into a monitor voltage, a monitor current monitored by one front monitor for monitoring intensity of the first to N-th laser beams emitted from first to N-th laser diodes and outputting the voltage as a monitor output signal. Therefore, it is possible to drive the laser light sources of the N-wavelength optical pickup by using a small number of the input/output terminals.

DETAILED DESCRIPTION OF THE INVENTION

Hereinafter, an embodiment of the invention will be described in detail with reference to the accompanying drawings.

As mentioned above, there has been developed an optical disc drive having a particular pickup in order to record on and play not only a DVD and a CD but also an HD-DVD (High Definition DVD). Such a particular optical pickup performs a recording and playing operation by individually using three kinds of laser beams which include a medium wavelength laser beam (a wavelength of 650 nm or so) for DVD, a long wavelength laser beam (a wavelength of 780 nm or so) for CD, and a short wavelength laser beam (a wavelength of 410 nm or so) for HD-DVD (HD), which is called "triple wavelength optical pickup".

Figure 1:
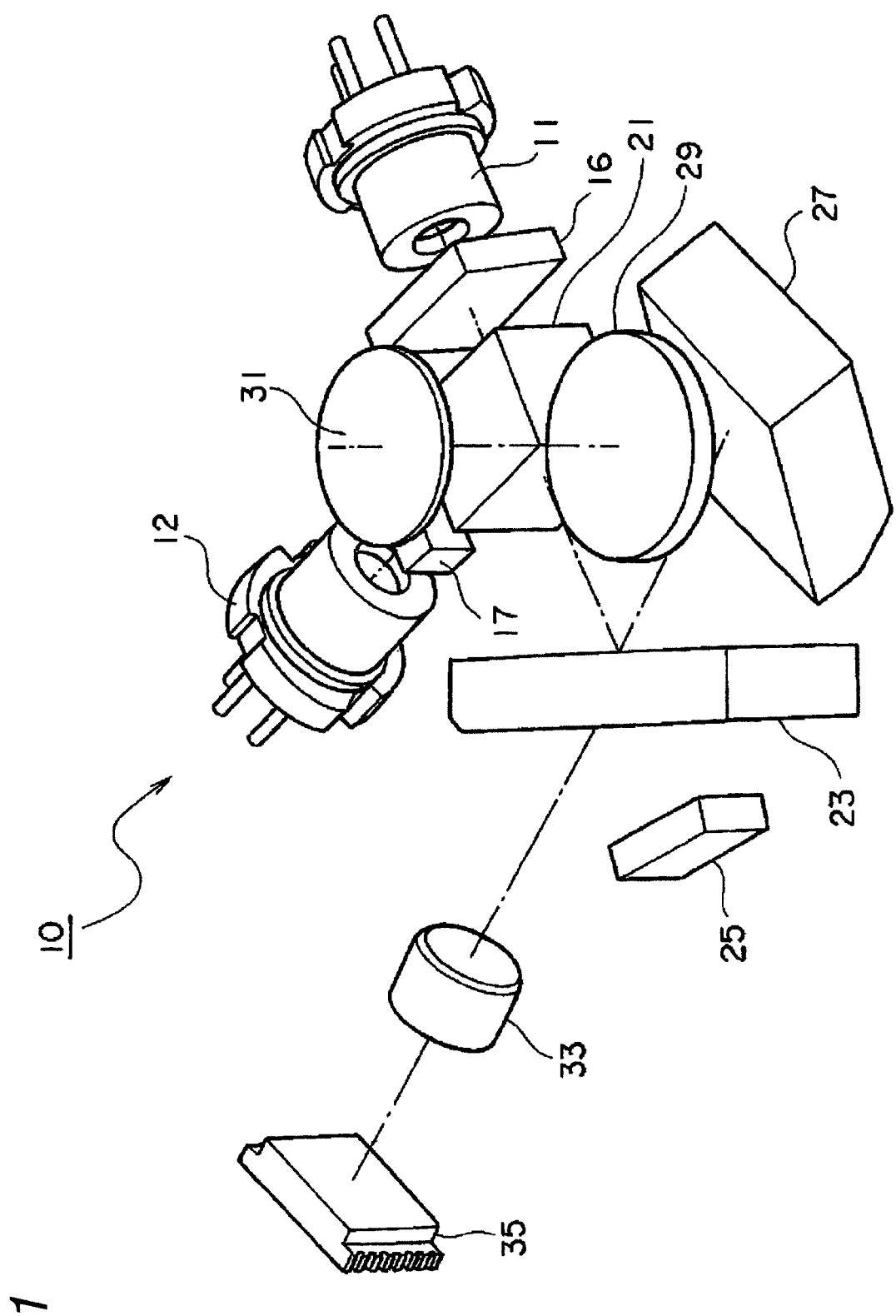
FIG. 1 is a system configuration diagram (light path diagram) illustrating an optical system of a triple wavelength optical pickup according to the invention.

FIG. 1 is a system configuration diagram illustrating an optical system of a triple wavelength optical pickup 10 according to an embodiment of the invention. The triple wavelength optical pickup 10 illustrated in the drawing includes a one-chip laser diode 11 and a blue laser diode 12 as laser light sources emitting laser beams.

The one-chip laser diode 11 is made by integrating a first laser diode (not shown in the drawings) and a second laser diode (not shown in the drawings) into one component (chip). The first laser diode (a first luminous point) and the second laser diode (a second luminous point) are apart from each other by a predetermined distance (for example, 100 μm). The first laser diode is a laser diode for emitting a first laser beam having a wavelength of 780 nm or so, which is used for a CD, as a first wavelength, and the laser diode is referred to as "CD-LD". The second laser diode is a laser diode for emitting a second laser beam having a wavelength of 650 nm or so, which is used for a DVD, as a second wavelength, and the laser diode is referred to as "DVD-LD". The blue laser diode 12, which is also called a third laser diode, for emitting a third laser beam having a wavelength of 410 nm or so, which is used for a HD-DVD (HD), as a third wavelength, and the laser diode is referred to as "HD-LD".

The triple wavelength optical pickup 10 includes an optical system for guiding any one of the first to third laser beams to an optical disc (not shown in the drawings) and guiding the reflected light from the optical disc to the photo detector 35. The optical system also includes an objective lens 31 disposed so as to face the optical disk. The laser light sources 11 and 12 and the photo detector 35 are mounted on outer wall of an optical base (which will be described later), and the optical system except for the objective lens 31 is mounted in the optical base.

On the other hand, the objective lens 31 is built in an objective lens driver (not shown in the drawings). In the objective lens driver, a damper base elastically supports an objective lens holder for holding the objective lens 31 by using a plurality of suspension wires.

The triple wavelength optical pickup 10 illustrated in the drawing is an optical system including first and second diffraction gratings 16 and 17, a first beam splitter 21, a second beam splitter 23, a front monitor 25, a start-up mirror (total reflection mirror) 27, a collimator lens 29, the objective lens 31, and a sensor lens (i.e., a detecting lens) 33.

A combination of the first diffraction grating 16, the first beam splitter 21, the second beam splitter 23, the start-up mirror 27, the collimator lens 29, the objective lens 31, and sensor lens 33 operates as a first or second optical system that guides the first or second laser beam emitted form the first or second laser diode to the optical disc (CD or DVD) side, and transmits and guides first or second returning light reflected from the optical disc side to the photo detector 35. Likewise, a combination of the second diffraction grating 17, the first beam splitter 21, the second beam splitter 23, the start-up mirror 27, the collimator lens 29, the objective lens 31, and the sensor lens 33 operates as a third optical system that guides the third beam emitted from the blue laser diode (i.e., the third laser diode) to the optical disc (HD-DVD) side, and transmits and guides third returning light reflected form the optical disc side to the photo detector 35.

Here, the blue laser diode (i.e., the third laser diode) 12 is disposed on the center of the optical axis, and the second laser diode in the one-chip laser diode 11 is also disposed on the center of the optical axis. Accordingly, the first laser diode in the one-chip laser diode 11 is disposed so as to depart from the optical axis. Accordingly, the photo detector 35 illustrated in the drawing is configured to receive the first returning light from the CD in the state where receiving direction thereof is deviated from the optical axis.

Hereinafter, an operation of the triple wavelength optical pickup illustrated in FIG. 1 will be described. As is generally known in this technical field, although the triple wavelength optical pickup is operated in one mode between a recording mode and a playing mode, however, a case where the optical pickup is operated in the play mode will be described as below.

First, an operation in the case where the CD is employed as an optical disc will be described. In this case, only the first laser diode (CD-LD) in the one-chip laser diode 11 is in an operable state, and the second laser diode (DVD-LD) and the blue laser diode (third laser diode) 12 (HD-LD) in the one-chip laser diode 11 are in a inoperable state.

The first laser beam emitted from the first laser diode (CD-LD) passes through the first diffraction grating 16, whereby the beam is divided into three laser beams for performing a tracking control, a focus control, and a tilting control. Then, the laser beams pass through the first beam splitter 21 and are incident on the second beam splitter 23. Some of the incident light is transmitted by the second beam splitter 23, and the transmitted light is received in the front monitor 25. The front monitor 25 monitors intensity of the first laser beam transmitted through the second beam splitter 23. On the other hand, the reflected light by the second beam splitter 23 in the incident light is reflected upward by the start-up mirror 27. When the laser beams reflected from the start-up mirror 27 are transmitted through the collimator lens 29, the laser beams which are diverging light become parallel light and are incident on the objective lens 31. The laser beams transmitted through the objective lens 31 are converged by the lens, and incident (focused) on the recording surface of the optical disc (CD).

The light (a first returning light) reflected from the recording surface of the optical disc (CD) passes through the objective lens 31, is transmitted through the collimator lens 29, and becomes converged light. The converged light is reflected by the start-up mirror 27, passes through the second beam splitter 23, is transmitted through the sensor lens 33, and is focused on (received in) the photo detector 35.

Hereinafter, an operation in the case where the DVD is employed as an optical disc will be described. In this case, only the second laser diode (DVD-LD) in the one-chip laser diode 11 is in an operable state, and the first laser diode (CD-LD) and the blue laser diode (third laser diode) 12 (HD-LD) in the one-chip laser diode 11 are in an inoperable state.

The second laser beam emitted from the second laser diode (DVD-LD) passes through the first diffraction grating 16, and then the beam passes through the first beam splitter 21 and is incident on the second beam splitter 23. Some of the incident light is transmitted by the second beam splitter 23, and the transmitted light is received in the front monitor 25. The front monitor 25 monitors luminous emittance of the second laser beam transmitted through the second beam splitter 23. On the other hand, the reflected light by the second beam splitter 23 in the incident light is reflected upward by the start-up mirror 27. When the laser beam reflected from the start-up mirror 27 is transmitted through the collimator lens 29, the laser beam which is diverging light becomes parallel light, and is incident on the objective lens 31. The laser beam transmitted through the objective lens 31 is converged by the lens and incident (focused) on the recording surface of the optical disc (DVD).

The light (a second returning light) reflected from the recording surface of the optical disc (DVD) passes through the objective lens 31, is transmitted through the collimator lens 29, and becomes converged light. The converged light is reflected by the start-up mirror 27, passes through the second beam splitter 23, is transmitted through the sensor lens 33, and is focused on (received in) the photo detector 35.

Finally, an operation in the case where the HD-DVD is employed as an optical disc will be described. In this case, only the blue laser diode (third laser diode) 12 (HD-LD) in the one-chip laser diode 11 is in an operable state, and the first laser diode (CD-LD) and the second laser diode (DVD-LD) in the one-chip laser diode 11 are in an inoperable state.

The third laser beam emitted from the blue laser diode (third laser diode) 12(HD-LD) passes through the second diffraction grating 17, whereby the beam is divided into three laser beams for performing a tracking control, a focus control, and a tilting control. Then, the three laser beams are reflected from the first beam splitter 21 and are incident on the second beam splitter 23. Some of the incident light is transmitted by the second beam splitter 23, and the transmitted light is received in the front monitor 25. The front monitor 25 monitors luminous emittance of the third laser beam transmitted through the second beam splitter 23. On the other hand, the reflected light by the second beam splitter 23 in the incident light is reflected upward by the start-up mirror 27. When the laser beams reflected from the start-up mirror 27 are transmitted through the collimator lens 29, the laser beams which are diverging light become parallel light, and are incident on the objective lens 31. The laser beams transmitted through the objective lens 31 are converged by the lens, and incident (focused) on the recording surface of the optical disc (HD-DVD).

The light (a third returning light) reflected from the recording surface of the optical disc (HD-DVD) passes through the objective lens 31, is transmitted through the collimator lens 29, and becomes converged light. The converged light is reflected by the start-up mirror 27, passes through the second beam splitter 23, is transmitted through the sensor lens 33, and is focused on (received in) the photo detector 35.

Figure 2:
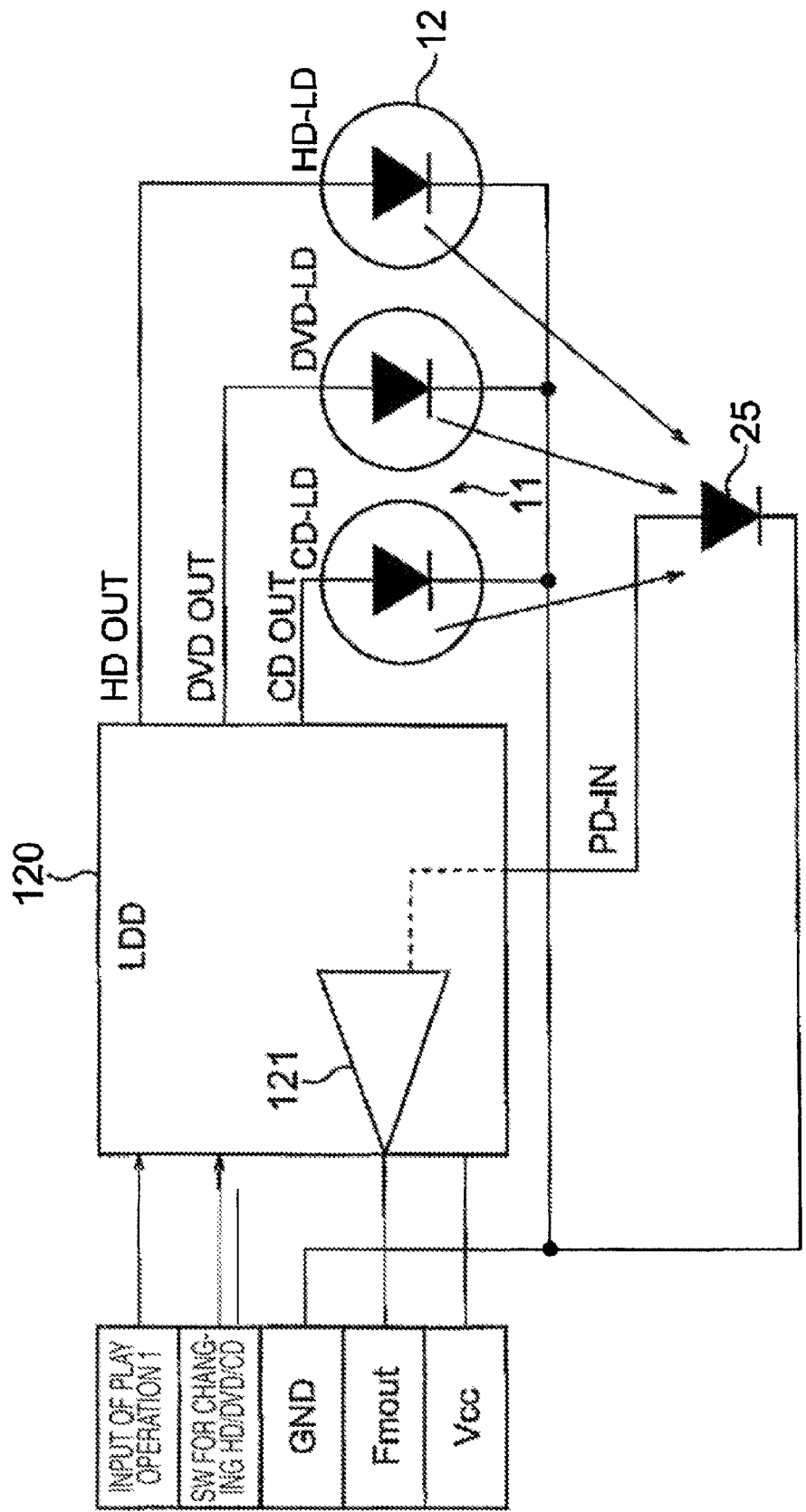
FIG. 2 is a block diagram illustrating a configuration of a laser diode driver (LDD), which is used in a triple wavelength optical pickup illustrated in FIG. 1, according to an embodiment of the invention.

FIG. 2 shows a laser diode driver (LDD) 120 according to an embodiment of the invention.

As described above, the triple wavelength optical pickup 10 includes laser light sources of the first to third laser diodes CD-LD, DVD-LD, and HD-LD for emitting the first to third laser beams, respectively, and includes one front monitor 25 for monitoring the luminous emittance of the first to third laser beams.

The laser diode driver 120 includes one current/voltage conversion amplifier 121 for converting a monitor current monitored by the front monitor 25 into a monitor voltage and outputting the voltage as a monitor output signal. The monitor output signal is sent to the optical disc drive.

On the other hand, in the laser diode driver 120, the playing input signal and the selection signal is supplied from the optical disc drive. As described later, the laser diode driver 120 has a selectively driving unit for selective driving any one of the first to third laser diodes CD-LD, DVD-LD, or HD-LD in response to the selection signal. Additionally, the current/voltage conversion amplifier 121 is configured to be capable of selecting first to third monitor-voltage conversion gains corresponding to the first to third laser diodes CD-LD, DVD-LD, and HD-LD. As described later, the laser diode driver 120 has a selection unit for selecting any one of the first to third monitor-voltage conversion gains of the current/voltage conversion amplifier 121 in response to the selection signal.

Figure 3:
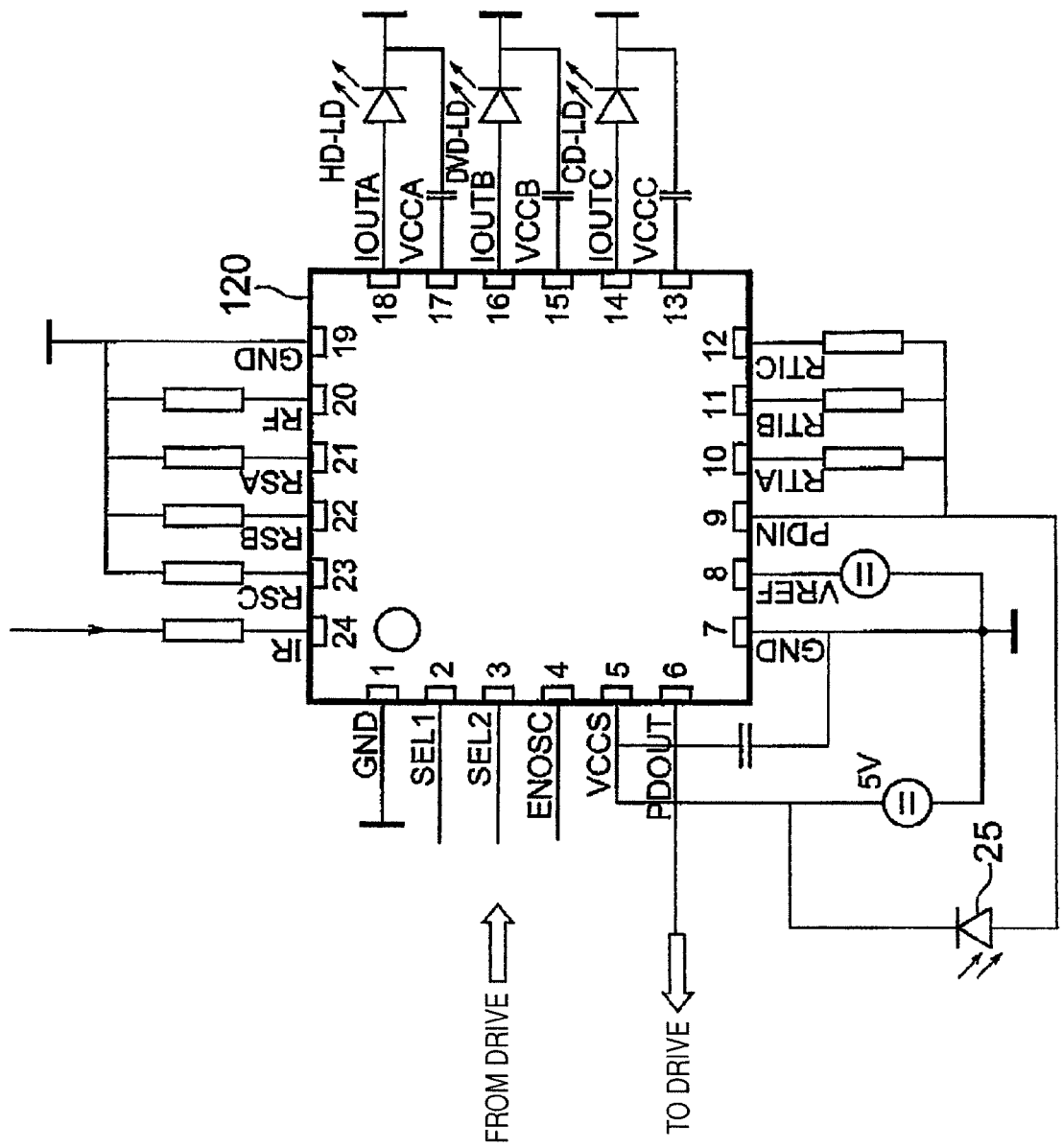
FIG. 3 is a top view illustrating input/output terminals of the laser diode driver illustrated in FIG. 2.

Referring to FIG. 3, input/output terminals of the laser diode driver 120 will be described.

The laser diode driver 120 has terminals connected to the first to third laser diodes CD-LD, DVD-LD, and HD-LD. Specifically, an IOUTC terminal, an IOUTB terminal, and an IOUTA terminal are connected to anodes of first to third laser diodes CD-LD, DVD-LD, and HD-LD, respectively. A VCCC terminal, a VCCB terminal, and a VCCA terminal are connected to cathodes of the first to third laser diodes CD-LD, DVD-LD, and HD-LD via condensers, respectively.

The laser diode driver 120 has terminals for setting the first to third monitor-voltage conversion gains of the current/voltage conversion amplifier 121 (FIG. 2). Specifically, a RTIC terminal which is a terminal for setting the monitor-voltage conversion gain used for the first laser diode CD-LD is connected to a PDIN terminal via a first resistor. A RTIB terminal which is a terminal for setting the monitor-voltage conversion gain used for the second laser diode DVD-LD is connected to the PDIN terminal via a second resistor. A RTIA terminal which is a terminal for setting the monitor-voltage conversion gain used for the third laser diode HD-LD is connected to the PDIN terminal via a third resistor. An anode of the front monitor 25 is connected to the PDIN terminal, and a cathode of the front monitor 25 is connected to a VCCS terminal.

The laser diode driver 120 has a SEL1 terminal and a SEL2 terminal for inputting the selection signal that selects any one of the first to third laser diodes, and an ENOSC terminal for inputting the playing input signal. In addition, the laser diode driver 120 has a PDOUT terminal for outputting the monitor output signal.

The laser diode driver 120 has a RF terminal, a RSA terminal, a RSB terminal, and a RSC terminal for performing various settings for a RF oscillator as described later. Resistors are connected to these terminals. Additionally, the laser diode driver 120 has an IR terminal for inputting reference current through a resistor. The laser diode driver 120 has a VFER terminal for inputting reference voltage.

Figure 4:
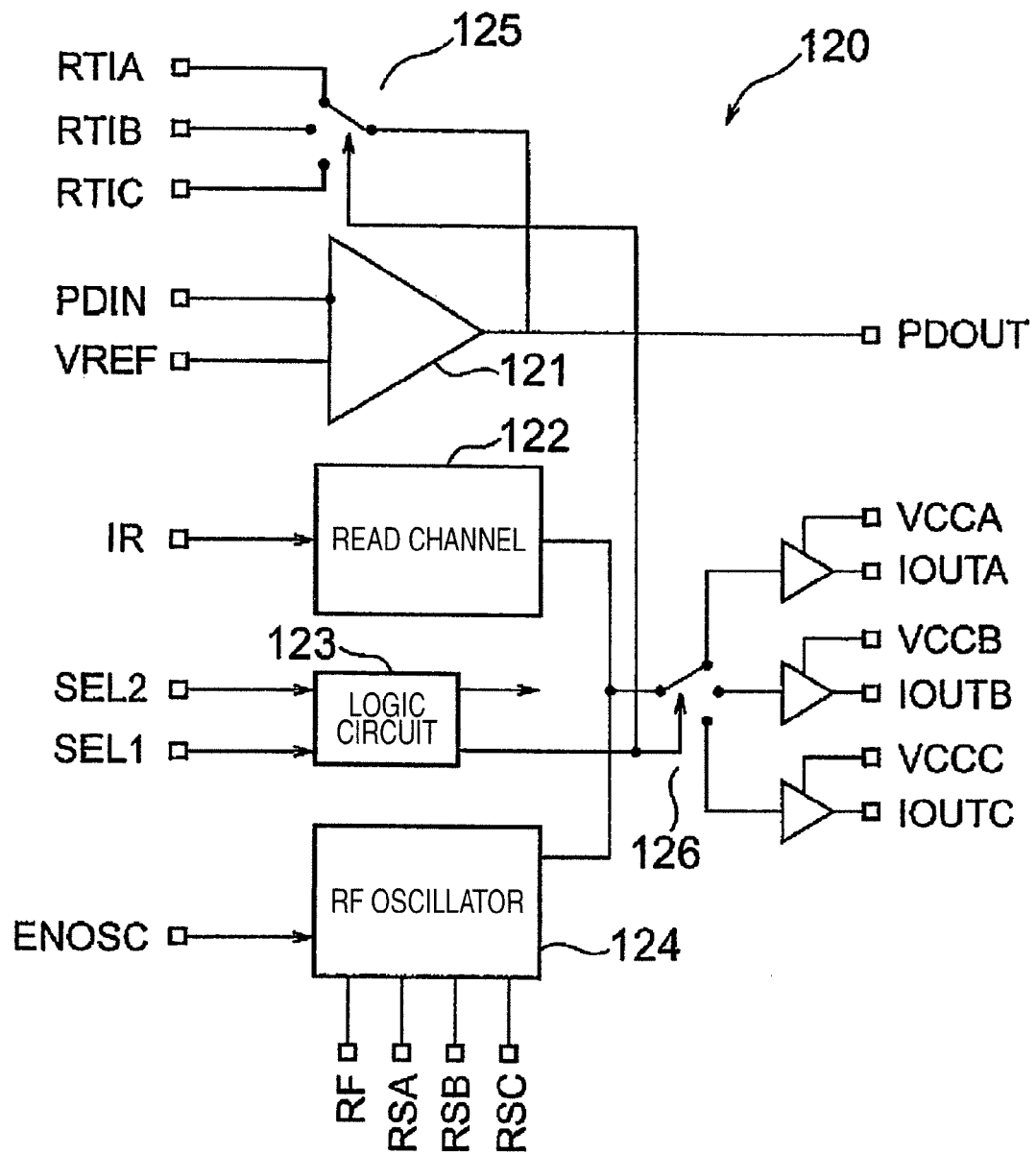
FIG. 4 is a block diagram illustrating an internal configuration of the laser diode driver illustrated in FIG. 3.

Referring to FIG. 4, the internal configuration of the laser diode driver 120 will be described in detail.

The laser diode driver 120 includes the current/voltage conversion amplifier 121 as described above. Input terminals of the current/voltage conversion amplifier 121 are connected to the PDIN terminal and the VREF terminal, and an output terminal of the current/voltage conversion amplifier 121 is connected to the PDOUT terminal.

The laser diode driver 120 includes a read channel circuit 122, a logic circuit 123, a RF oscillator 124, a first selector 125, and a second selector 126.

An input terminal of the read channel circuit 122 is connected to the IR terminal, and an output terminal of the read channel circuit 122 is connected to a fixed contact of the second selector 126. Input terminals of the logic circuit 123 are connected to the SEL1 terminal and the SEL2 terminal, and output terminals of the logic circuit 123 are connected to control terminals of the first and second selectors 125 and 126. Consequently, the logic circuit 123 controls selection of the first and second selectors 125 and 126 in response to the selection signal supplied from the SEL1 terminal and the SEL2 terminal.

An input terminal of the RF oscillator 124 is connected to the ENOSC terminal. The RF oscillator 124 is connected to the RF terminal, the RSA terminal, the RSB terminal, and the RSC terminal. An output terminal of the RF oscillator 124 is connected to the fixed contact of the second selector 126.

First to third drivers of the second selector 126 are connected to first to third movable contacts, respectively. The first driver is connected to the first laser diode CD-LD via the IOUTC terminal and the VCCC terminal. The second driver is connected to the second laser diode DVD-LD via the IOUTB terminal and the VCCB terminal. The third driver is connected to the third laser diode HD-LD via the IOUTA terminal and the VCCA terminal. Accordingly, a combination among the logic circuit 123, the second selector 126, and the first to third drivers is operated as the selective driving unit for selectively driving any one of the first to third laser diodes in response to the selection signal.

Additionally, the output terminal of the current/voltage conversion amplifier 121 is connected to the fixed contact of the first selector 125. The first to third movable contacts of the first selector 125 is connected to the RTIC terminal, the RTIB terminal, and the RTIA terminal. Accordingly, a combination of the logic circuit 123 and the first selector 125 is operated as the selective driving unit for selectively driving any one of the first to third monitor-voltage conversion gains of the current/voltage conversion amplifier 121 in response to the selection signal.

With such a configuration, the first to third laser diodes CD-LD, DVD-LD, and HD-LD can be driven by one playing input signal, respectively. In addition, the current/voltage conversion amplifier 121 for converting the monitor current monitored by the front monitor 25 into the monitor voltage can respond to the selection signal by synchronizing the switch among the first to third laser diodes CD-LD, DVD-LD, and HD-LD, and can select any one of the first to third monitor-voltage conversion gains. Therefore, the current/voltage conversion amplifier 121 can monitor the luminous emittance of each laser diode.

In any case, the laser diode driver 120 according to the embodiment can control power of the first to third laser diodes CD-LD, DVD-LD, and HD-LD by using one playing input signal and can output only one monitor output signal. With such a configuration, the input/output terminals of the laser diode driver 120 are commonly used, and thereby it is possible to reduce the number of terminals of the triple wavelength optical pickup 10.

Although an embodiment of the invention has been described, the present invention is not limited thereto. For example, in the embodiment mentioned above, the case where the HD-DVD is used as an optical disc corresponding to the blue laser beam was described as an example, but as might be expected, it is possible to use the Blu-ray disc instead of the HD-DVD. Additionally, in the embodiment mentioned above, the triple wavelength optical pickup was described as an example of an optical pickup, but the invention is not limited thereto. Generally, the invention can be applied to the N-wavelength optical pickup dealing with N (N is an integer which is two or more) wavelengths.

The entire disclosure of Japanese Patent Application No. 2006-270354 filed on Oct. 2, 2006 is expressly incorporated by reference herein.

What is claimed is:

1. A laser diode driver for an N-wavelength optical pickup which includes N laser light sources of the first to N laser diodes for emitting first to N laser beams, respectively, of differing wavelengths and one front monitor for monitoring the luminous emittance of the first to N laser beams comprising:

a single current/voltage conversion amplifier for converting a monitor current monitored by the front monitor into a monitor voltage and outputting the voltage as a monitor output signal which is sent to an optical disc drive, a playing input signal and a selection signal being supplied from the optical disc drive; and a selective driving unit for selectively driving any one of the first to N laser diodes in response to selection signals, the current/voltage conversion amplifier being configured to be capable of selecting first to N monitor-voltage conversion gains corresponding to the first to N laser diodes, the selective driving unit comprising:

a logic circuit receiving the selection signal and connected to control terminals of a first selector, an output terminal of the current/voltage conversion amplifier being connected to a fixed contact of the first selector, the first selector being operated to selectively drive any one of the first to N monitor-voltage conversion gains of the current/voltage conversion amplifier in response to the selection signal received by the logic circuit, wherein N is an integer which is two or more.

2. The laser diode driver according to claim 1, wherein the logic circuit is connected to control terminals of a second selector and further comprising:

a read channel circuit connected to a reference current terminal, an output terminal of the read channel circuit being connected to a fixed contact of the second selector, first to N drivers connected to first to N movable contacts, respectively, of the second selector, the first to N drivers being connected to the first to N laser diodes, respectively.

3. The laser diode driver according to claim 2, wherein N is equal to three and the selection signal comprises first and second selection signals and the logic circuit controls the first and second selectors to select one of three positions in response to the first and second selection signals.

4. The laser diode driver according to claim 3, further comprising:
   a write channel circuit comprising an RF oscillator having an output terminal connected to the fixed contract of the second selector.

5. An N-wavelength optical pickup comprising:
   an optical system for guiding any one of first to N laser beams to an optical disc and guiding reflected light from the optical disc to a photo detector, the optical system including a front monitor which monitors luminous intensity of the first to N laser beams;
   a laser diode driver comprising:
      a single current/voltage conversion amplifier for converting a monitor current monitored by the front monitor into a monitor voltage and outputting the voltage as a monitor output signal which is sent to an optical disc drive, a playing input signal and a selection signal being supplied from the optical disc drive; and
      a selective driving unit for selectively driving any one of the first to N laser diodes in response to the selection signals, the current/voltage conversion amplifier being configured to be capable of selecting first to N monitor-voltage conversion gains corresponding to the first to N laser diodes, the selective driving unit comprising:
         a logic circuit receiving the selection signal and connected to control terminals of a first selector, an output terminal of the current/voltage conversion amplifier being connected to a fixed contact of the first selector, the first selector being operated to selectively drive any one of the first to N monitor-voltage conversion gains of the current/voltage conversion amplifier in response to the selection signals received by the logic circuit,
   wherein N is an integer which is two or more.

6. The N-wavelength optical pickup according to claim 5, wherein the logic circuit is connected to control terminals of a second selector and further comprising:
   a read channel circuit connected to a reference current terminal, an output terminal of the read channel circuit being connected to a fixed contact of the second selector, first to N drivers connected to first to N movable contacts, respectively, of the second selector, the first to N drivers being connected to the first to N laser diodes, respectively.

7. The N-wavelength optical pickup according to claim 6, wherein N is equal to three and the selection signal comprises first and second selection signals and the logic circuit controls the first and second selectors to select one of three positions in response to the first and second selection signals.

8. The N-wavelength optical pickup according to claim 7, further comprising:
   a write channel circuit comprising an RF oscillator having an output terminal connected to the fixed contract of the second selector.

* * * * *